B. G. STEWARD.
Wagon-Brakes.
No. 150,100. Patented April 21, 1874.
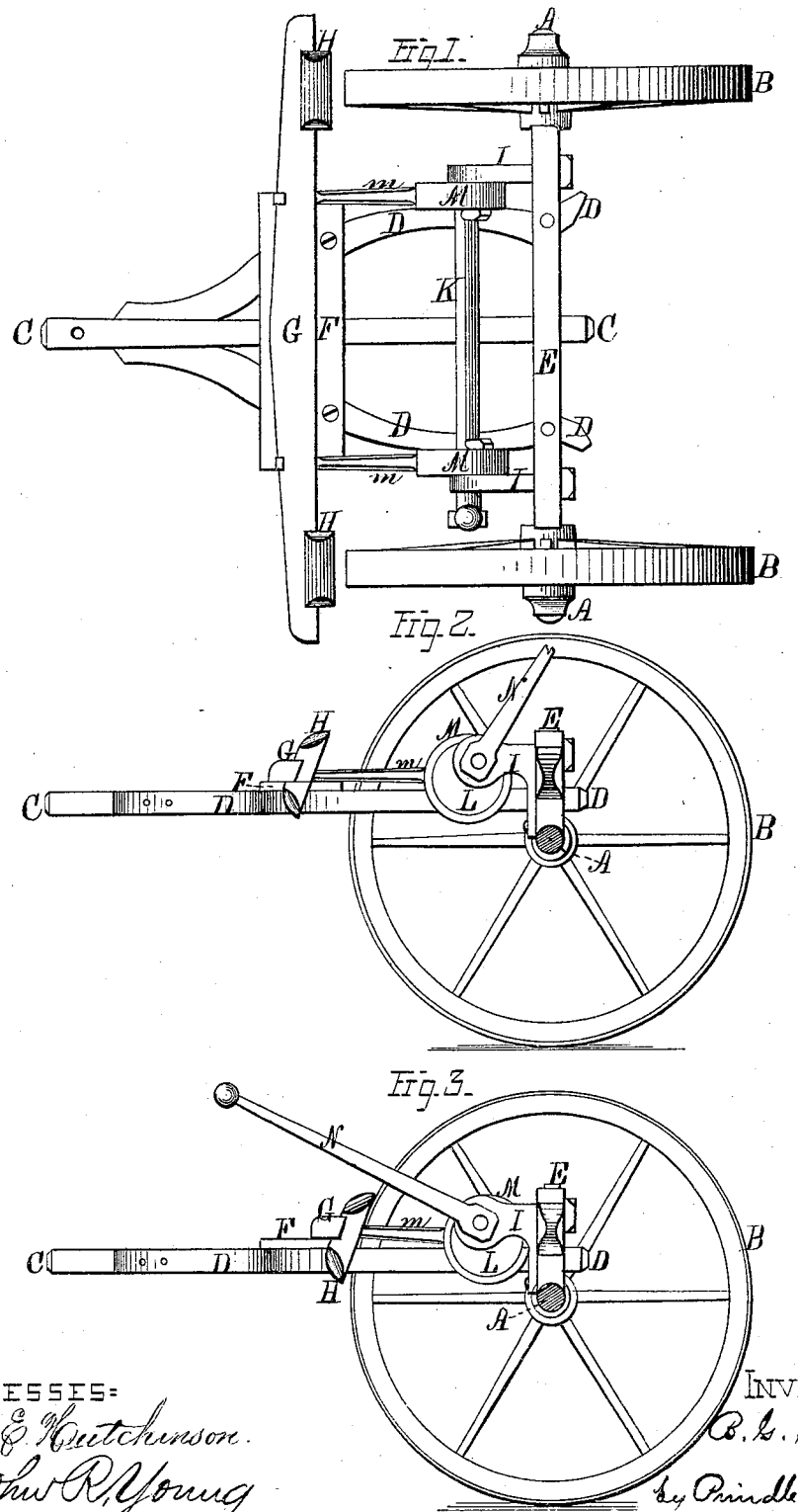
Witnesses:
Jas. E. Hutchinson
John R. Young
Inventor:
B. G. Steward
by Prindle and Dean
his Attorneys

UNITED STATES PATENT OFFICE.

BRICE G. STEWARD, OF POWHATAN, OHIO.

IMPROVEMENT IN WAGON-BRAKES.

Specification forming part of Letters Patent No. 150,100, dated April 21, 1874; application filed February 27, 1874.

*To all whom it may concern:*

Be it known that I, BRICE G. STEWARD, of Powhatan, in the county of Belmont and in the State of Ohio, have invented certain new and useful Improvements in Wagon-Brakes; and do hereby declare that the following is a full, clear, and exact description thereof, reference being had to the accompanying drawing making a part of this specification, in which—

Figure 1 is a plan view of the upper side of my improved brake as attached to the running-gear of a wagon. Fig. 2 is a side elevation of the same, showing the brake open or with its shoes removed from contact with the wheels; and Fig. 3 is a like view of said brake, its shoes being forced against said wheels.

Letters of like name and kind refer to like parts in each of the figures.

The design of my invention is to increase the durability, efficiency, and ease of operation of a wagon-brake; and it consists in the construction and combination of its operative parts, substantially as and for the purpose hereinafter specified.

In the annexed drawing, A represents the rear axle of a wagon, upon the ends of which are journaled two ordinary wheels, B and B. Attached to the upper side of the axle A, between the wheels B and B, are the rear ends of the reach C and hounds D and D, above which is placed a bolster, E, all of usual construction. Secured upon the upper side of the reach C and hounds D and D, in front of the wheels B and B, and in a line at a right angle to the draft, is a board, F, which serves as a support and guide for a brake-beam, G, which latter is provided with suitable shoes H and H, that, when said beam is moved rearward, are brought into contact with the peripheries of said wheels, and operate to retard or arrest their motion, in the usual manner. From the front side, and near the ends of the bolster E, two lugs, I and I, extend horizontally forward, and have journaled within their forward ends a shaft, K, upon which, just within each lug, is secured an eccentric, L, which eccentric is encircled by a strap, M, and the latter connected, by means of a rod, *m*, with the brake-beam G. A lever, N, attached to one end of the shaft K, enables the same to be rotated within its bearings, so as to turn the eccentrics to the rear or to the front, and correspondingly move the brake-beam toward or from the wheels.

The position of the operating-lever with relation to the eccentrics is such as to cause said lever to extend upward when the brake-shoes are removed from contact with the wheels, by which means a forward pull upon the upper end of said lever will throw the brake into engagement, such arrangement enabling said brake to be operated from the front end of the wagon by means of a rope attached to the upper end of said lever.

The advantage possessed by my brake over those ordinarily used is due to the great power afforded by the eccentrics, as compared with cranks or other similar appliances for moving the brake-beam.

Having thus fully set forth the nature and merits of my invention, what I claim as new is—

The brake-beam G, shoes H and H, journaled shaft K, eccentrics L and L, straps M and M, connecting-rods *m* and *m*, and operating-lever N, constructed and combined and applied to the running-gear of a wagon in the manner and for the purpose substantially as specified.

In testimony that I claim the foregoing I have hereunto set my hand this 11th day of February, 1874.

BRICE G. STEWARD.

Witnesses:
MADISON M. SCOTT,
SAMUEL B. IRISH.